(12) United States Patent
Yamada (10) Patent No.: US 9,118,862 B2
(45) Date of Patent: Aug. 25, 2015

(54) IMAGE PROCESSING DEVICE HAVING IMPROVED QUALITY OF ITS PRINTED IMAGES

(75) Inventor: Ryuji Yamada, Ogaki (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 567 days.

(21) Appl. No.: 13/272,732

(22) Filed: Oct. 13, 2011

(65) Prior Publication Data

US 2012/0098995 A1    Apr. 26, 2012

(30) Foreign Application Priority Data

Oct. 20, 2010    (JP) .................................. 2010-235617

(51) Int. Cl.
| | |
|---|---|
| H04N 9/73 | (2006.01) |
| H04N 1/407 | (2006.01) |
| H04N 1/405 | (2006.01) |
| H04N 1/60 | (2006.01) |

(52) U.S. Cl.
CPC ............. *H04N 1/4078* (2013.01); *H04N 1/405* (2013.01); *H04N 1/6027* (2013.01)

(58) Field of Classification Search
CPC .... H04N 1/405; H04N 1/6027; H04N 1/4078
USPC ......... 348/223.1, 207.2; 358/3.13–3.14, 3.16, 358/3.19
See application file for complete search history.

(56) References Cited

U.S. PATENT DOCUMENTS

| | | | |
|---|---|---|---|
| 2004/0155916 A1* | 8/2004 | Uchiyama et al. ............... | 347/15 |
| 2005/0002048 A1* | 1/2005 | Takahashi et al. .............. | 358/1.9 |
| 2005/0238374 A1* | 10/2005 | Yoshida .......................... | 399/49 |
| 2009/0196525 A1 | 8/2009 | Tsukamoto et al. | |
| 2010/0079482 A1 | 4/2010 | Tsukamoto et al. | |

FOREIGN PATENT DOCUMENTS

| | | |
|---|---|---|
| JP | 2-161873 A | 6/1990 |
| JP | 2001-52157 A | 2/2001 |
| JP | 2002-262084 A | 9/2002 |
| JP | 2004-230743 A | 8/2004 |
| JP | 2004-289236 A | 10/2004 |
| JP | 2009-207113 A | 9/2009 |

OTHER PUBLICATIONS

Shimada, Kazunitsu, Device and Method for Image Processing, Feb. 23, 2001, Publication #JP 2001-052157, Machine Translation.*

(Continued)

*Primary Examiner* — Twyler Haskins
*Assistant Examiner* — Carramah J Quiett
(74) *Attorney, Agent, or Firm* — Scully, Scott, Murphy & Presser, P.C.

(57) ABSTRACT

An image processing device includes a storage unit, a processing unit, and a memory. The storage unit stores a dither matrix. The memory has instructions stored thereon that, when executed by the processing unit, cause the processing unit to function as: an acquiring unit that is configured to acquire an image including a plurality of pixels, each pixel having a color value; an updating unit that is configured to update a color value of at least one pixel by adding a random number to the color value; and a thresholding unit that is configured to convert the updated color value into a binary value by using the dither matrix.

10 Claims, 10 Drawing Sheets

(56) References Cited

OTHER PUBLICATIONS

Murakami, Yoshinori, Image Processing Method, Image Processor, Image Forming Device, Image Processing Program and Computer Readable Recording Medium, Sep. 13, 2002, Publication #JP 2002-262084, Machine Translation.*

Japanese Official Action dated Feb. 4, 2014 received in related application JP 2010-235617.

* cited by examiner

| FLAG | DENSITY RANGE | RANDOM NUMBER RANGE FOR C | RANDOM NUMBER RANGE FOR M | RANDOM NUMBER RANGE FOR Y | RANDOM NUMBER RANGE FOR K |
|---|---|---|---|---|---|
| 1 | 1~20% | ±2 | ±2 | ±2 | ±2 |
| 2 | 21~40% | ±4 | ±3 | ±2 | ±4 |
| 3 | 41~60% | ±5 | ±5 | ±5 | ±5 |
| 4 | 61~80% | ±7 | ±6 | ±5 | ±7 |
| 5 | 81~100% | ±5 | ±5 | ±5 | ±8 |

MEASURED LOCATION

DENSITY PATCH

IMAGE PROCESSING DEVICE HAVING IMPROVED QUALITY OF ITS PRINTED IMAGES

CROSS REFERENCE TO RELATED APPLICATION

This application claims priority from Japanese Patent Application No. 2010-235617 filed Oct. 20, 2010. The entire content of the priority application is incorporated herein by reference.

TECHNICAL FIELD

The present invention relates to an image processing device.

BACKGROUND

Electrophotographic printing devices that form images in toner based on binary image data can produce horizontal streaks in the printed images referred to as "banding" that reduce image quality. A conventional technology for suppressing a decline in the quality of images printed by electrophotographic printing devices reduces textures generated in the printed images by first converting the image data representing the image to be printed into a number of levels that can be rendered on the printing device, and subsequently adding noise in the form of random numbers.

SUMMARY

However, when the images formed by the electrophotographic printing device in toner based on binary image data includes isolated dots or blank parts (parts with no dots), sometimes the isolated dots are omitted and the isolated blank parts are filled in due to scattered toner and other phenomena occurring during the printing operation. This problem may be suppressed by subjecting the image data to a thresholding process using a dither matrix with a pattern that reduces the likelihood of isolated dots and blank parts, but isolated dots and isolated blank parts are more apt to be generated when adding noise according to the technology described above. Consequently, it is likely that the quality of printed images will drop due to the omission of isolated dots and the filling in of isolated blank parts.

In view of the foregoing, it is an object of the present invention to provide a technology for suppressing a drop in the quality of images printed by electrophotographic printing devices.

In order to attain the above and other objects, the invention provides an image processing device including a storage unit that stores a dither matrix, a processing unit, and a memory. The memory has instructions stored thereon that, when executed by the processing unit, cause the processing unit to function as: an acquiring unit that is configured to acquire an image including a plurality of pixels, each pixel having a color value; an updating unit that is configured to update a color value of at least one pixel by adding a random number to the color value; and a thresholding unit that is configured to convert the updated color value into a binary value by using the dither matrix.

According to another aspect, the present invention provides an image processing method including: acquiring, by an image processing device, an image including a plurality of pixels, each pixel having a color value; updating a color value of at least one pixel by adding a random number to the color value; and converting the updated color value into a binary value by using a dither matrix.

According to another aspect, the present invention provides a non-transitory computer readable storage medium storing a set of program instructions installed on and executed by an image processing device, the program instructions comprising: acquiring an image including a plurality of pixels, each pixel having a color value; updating a color value of at least one pixel by adding a random number to the color value; and converting the updated color value into a binary value by using a dither matrix stored in the image processing device.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a preferred embodiment of the present invention will be described while referring to FIGS. 1 through 10(*d*).

Figure 1:
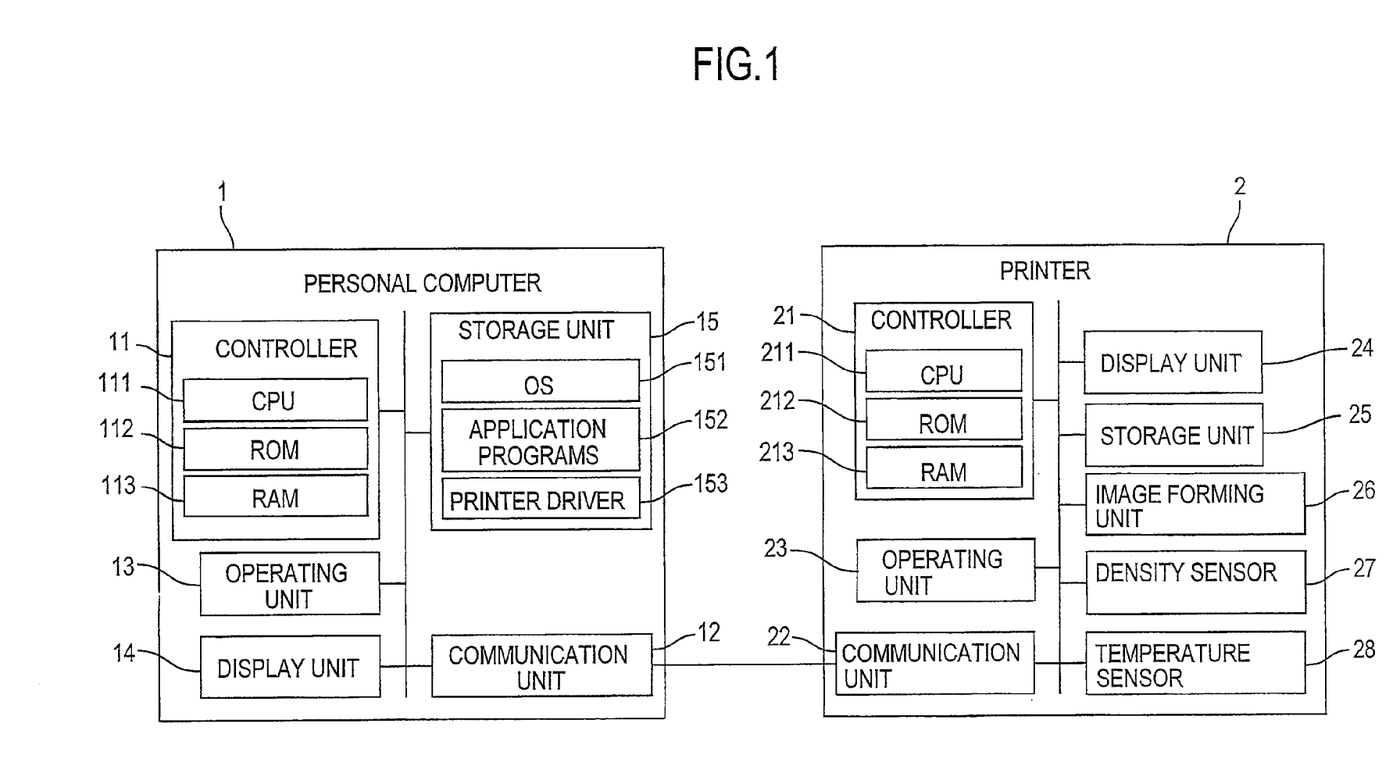
FIG. 1 is a block diagram showing a printing system including an image processing device according to an embodiment of the present invention.

FIG. 1 is a block diagram showing the general structure of a communication system including a personal computer (PC) 1, and a printer 2 that are capable of performing data communications with each other.

The PC 1 is a common data processor that includes a controller 11, a communication unit 12, an operating unit 13, a display unit 14, and a storage unit 15. The controller 11 performs overall control of each component in the PC 1. The controller 11 includes a CPU 111, a ROM 112, and a RAM 113.

The communication unit 12 is an interface for performing data communications with the printer 2. The operating unit 13 is an input device that allows the user to input instructions through external operations. In this embodiment, the operating unit 13 is configured of a keyboard and a pointing device (a mouse, touchpad, or the like).

The display unit 14 is an output device that displays various information to the user as images that the user can interpret. In the preferred embodiment, the display unit 14 includes a liquid crystal display.

The storage unit 15 is a nonvolatile storage device for storing data that can be overwritten. In this embodiment, a hard disk drive is used as the storage unit 15. Various software programs are installed on the storage unit 15, including an operating system (OS) 151, an application program 152 such as a graphics tool, and a printer driver 153 that enables the personal computer 1 to use the printer 2. When the user of the personal computer 1 performs a print operation in the application program 152 while the application program 152 is running, the personal computer 1 transmits a print job to the printer 2 as a process of the printer driver 153. The print job is a print command for printing print data (image data configured of write commands in the preferred embodiment) representing the image to be printed.

The printer 2 is an electrographic-type image forming device including a controller 21, a communication unit 22, an operating unit 23, a display unit 24, a storage unit 25, an image forming unit 26, a density sensor 27, and a temperature sensor 28.

The controller 21 performs overall control of each component in the printer 2. The controller 21 includes a CPU 211, a ROM 212, and a RAM 213. The communication unit 22 is an interface for performing data communications with the personal computer 1. The operating unit 23 is an input device that allows the user to input instructions through external operations. The operating unit 23 includes various operating buttons.

The display unit 24 is an output device and includes a small liquid crystal display for displaying various data as images that convey information to the user.

The storage unit 25 is a nonvolatile storage device for storing data that can be overwritten. In this embodiment, flash memory is employed as the storage unit 25. The storage unit 25 stores various program for controlling the controller 21 to perform a printing process described below (FIG. 2(*b*)). The storage unit 25 further stores dither matrices used for converting multi-values image data into binary image data (a clustered-dot dither matrix in this embodiment) and a color profile used for converting 256-level RGB values to 256-level CMYK values.

The image-forming unit 26 is a component for forming images expressed in binary image data as visible images according to an electrophotographic method that uses toner in the four colors cyan (C), magenta (M), yellow (Y), and black (K). The image-forming unit 26 includes four photosensitive members corresponding to the four toner colors. During image formation in the image-forming unit 26, chargers apply an electric charge to the surfaces of the photosensitive members, and exposure devices such as LED heads irradiate light onto the charged surfaces of the photosensitive members to form electrostatic latent images thereon based on the binary image data for each of the CMYK colors that altogether represent a color image. The electrostatic latent images formed on the photosensitive members are developed into visible toner images by toner in the CMYK colors supplied from developing devices. The toner images in each of the CMYK colors are transferred onto a sheet of paper or other recording medium conveyed by a conveying belt so as to be superposed on each other. Subsequently, the toner images are fixed to the recording medium by heat in a fixing unit, thereby completing the process of forming an image on the recording medium. The components used for this image forming process are well known in the art and, therefore, have been omitted from the drawings.

Figure 2A:
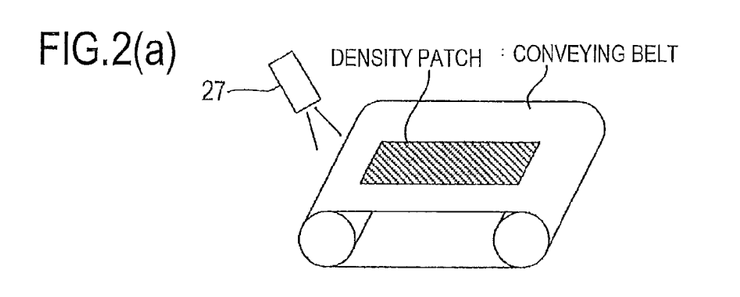
FIG. 2(a) is an explanatory diagram showing a method for measuring a density patch.
Figure 2B:
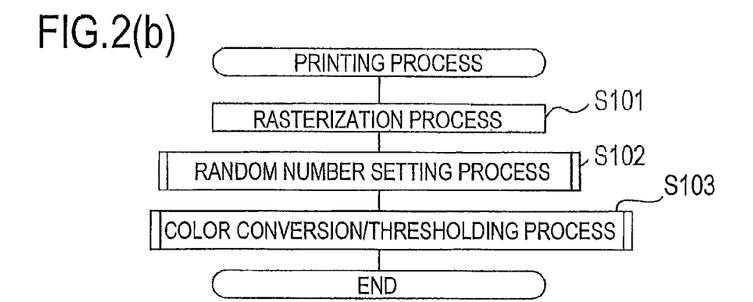
FIG. 2(b) is a flowchart illustrating steps in a printing process executed by the image processing device.
Figure 2C:
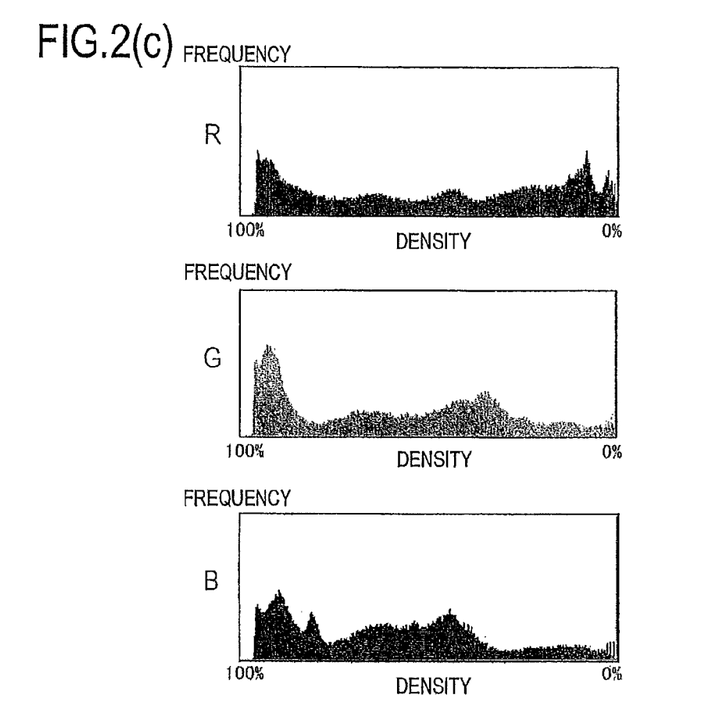
FIG. 2(c) is a graph showing color histograms of R, G, and B.

When a random number amplitude setting process described later is executed, the image-forming unit 26 also forms density patches directly on the conveying belt with the toner used for printing, as illustrated in FIG. 2(*a*). The density patches represent a plurality of density levels for each of the CMYK colors.

As shown in FIG. 2(*a*), the density sensor 27 is used for measuring the densities of the density patches formed by the image-forming unit 26 on the conveying belt. The image-forming unit 26 is also provided with a cleaning member (not shown) for recovering the density patches formed on the conveying belt after the density sensor 27 has measured the densities thereof. The temperature/humidity sensor 28 is disposed inside the printer 2 and functions to detect temperature and humidity.

2. Processes Executed in the Printing System

Next, a printing process executed by the controller 21 of the printer 2 (and more specifically, the CPU 211 of the controller 21) will be described with reference to the flowchart in FIG. 2(*b*). The controller 21 executes this printing process upon receiving a print job from the personal computer 1.

In S101 at the beginning of the printing process, the controller 21 executes a rasterization process for developing print data related to the print job (image data configured of write commands) into image data expressed in 256-level RGB values.

In S102 the controller 21 executes a random number setting process to configure a random number setting region. In the random number setting process, the controller 21 divides the image represented by the image data into a plurality of image areas and sets an amplitude (i.e., range) of random numbers to be used in the process of S103 for each image area. The random number setting process will be described later in greater detail with reference to FIG. 3.

In S103 the controller 21 executes a color conversion/thresholding process for converting the image data produced in the rasterization process into image data expressed in 256-level CMYK values using color profiles; a random number adding process for adding a random number to the pixel values in image data produced in the color conversion process; and a thresholding process for converting image data produced in the random number adding process into binary values using a dither matrix. This color conversion/thresholding process produces binary image data for each of the CMYK colors. The printer 2 then forms an image in toner on the printing medium based on this binary image data. The user can set an option indicating whether or not to execute the random number adding process. The color conversion/thresholding process will be described later in greater detail with reference to FIG. 6(b).

Next, the random number setting process executed in S102 of the printing process described above (see FIG. 2(b)) will be described with reference to the flowchart in FIG. 3.

In S201 at the beginning of the random number setting process, the controller 21 initializes a random number setting region. In this embodiment, the random number setting region is a storage area allocated in the RAM 213 for storing flags that indicate the amplitude (range) of a random number to be added in the adding process. Flags are provided for each of the CMYK colors for each pixel of the image to be printed.

Figure 4A:
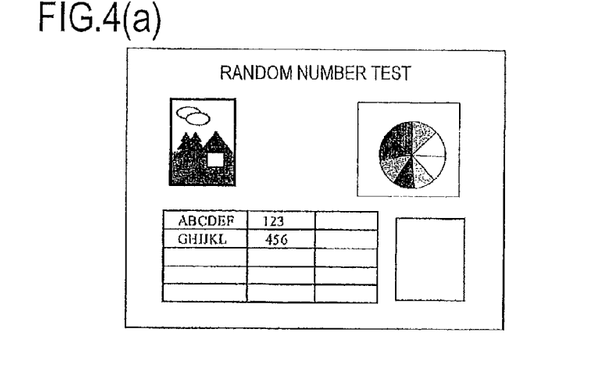
FIG. 4(a) is an explanatory diagram showing an example of sample image.
Figure 4B:
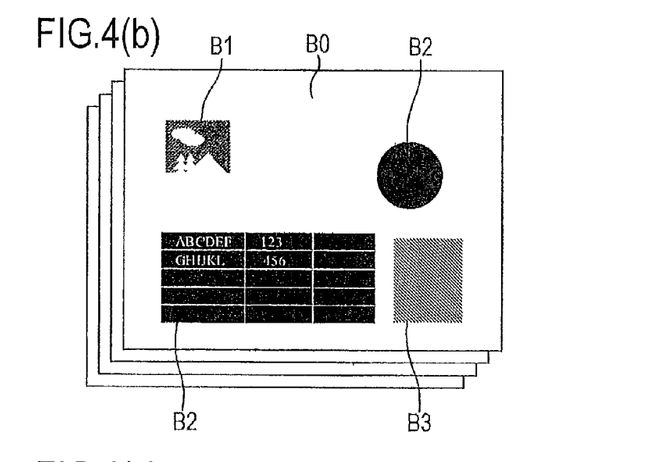
FIG. 4(b) is a conceptual diagram showing a random number setting region corresponding to the sample image shown in FIG. 4(a)

FIG. 4(a) shows a sample image to be printed. FIG. 4(b) is a conceptual drawing showing the random number setting region storing flags for each of the CMYK colors in the image of FIG. 4(a). In FIG. 4(b), a flag has been initialized to "0" for each pixel within a region B0 depicted in white, while flags for pixels in the regions B1, B2, and B3 colored in varying shades of black have been set to different values ("1", "2", and "3", for example) indicating different ranges of random values. In the random number adding process, a random number is added to each pixel whose flag is set to a value other than "0". In the initialization process of S201, flags for all pixels in the random number setting region are initialized to "0". In the process of S210 described later, the flags for pixels in regions where random numbers are to be added are set to values indicating the amplitude (range) of possible random numbers.

Figure 5:
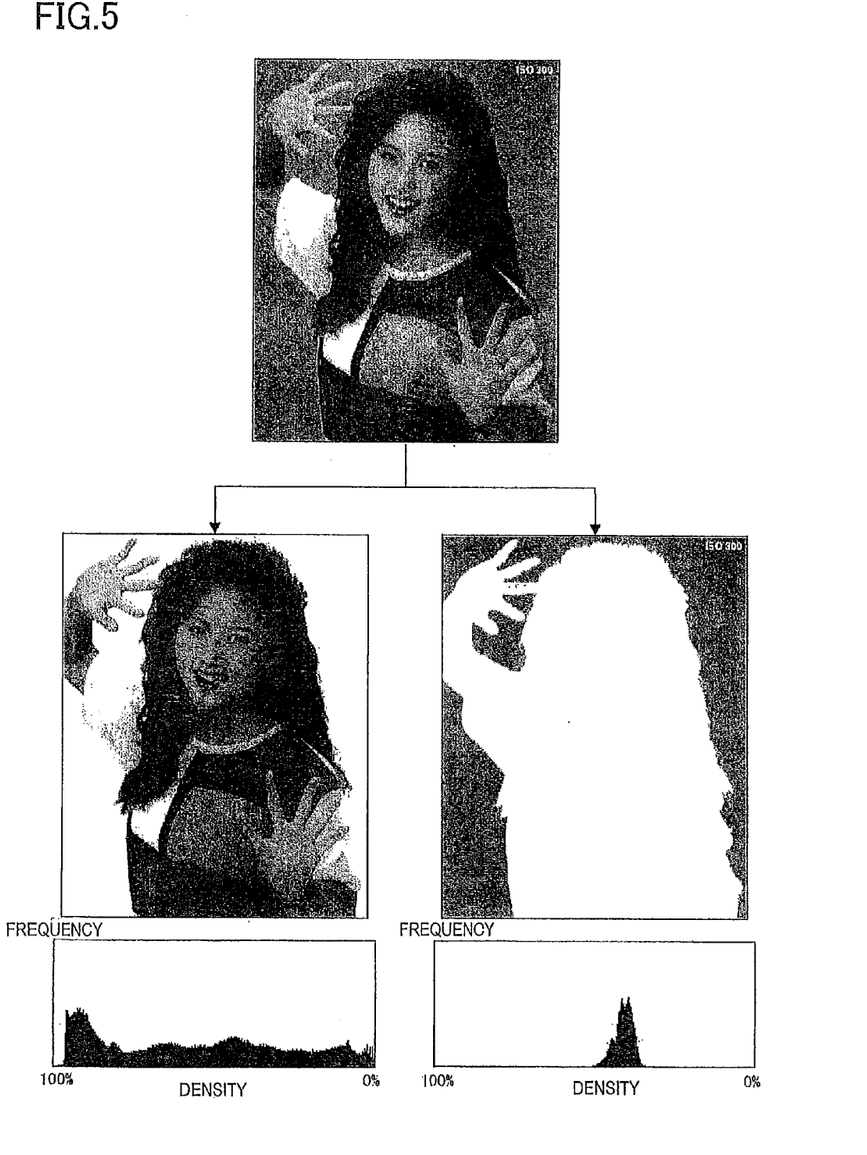
FIG. 5 is an explanatory diagram showing how to divide image into a plurality of image areas.

Returning to FIG. 3, in S202 the controller 21 executes an image area separation process on image data produced from the rasterization process. As illustrated in FIG. 5, the image area separation process is performed to separate the image into a plurality of image areas by detecting edges in the image and dividing the image into edge regions defined by the detected edges. In other words, the controller 21 divides an image into a plurality of image areas based on the detected edge. In the example of FIG. 5, the image has been separated into an image area constituting the gray background and an image area constituting the woman in the foreground. The example shown in FIG. 5 is an ISO/JIS-SCID image.

Figure 3:
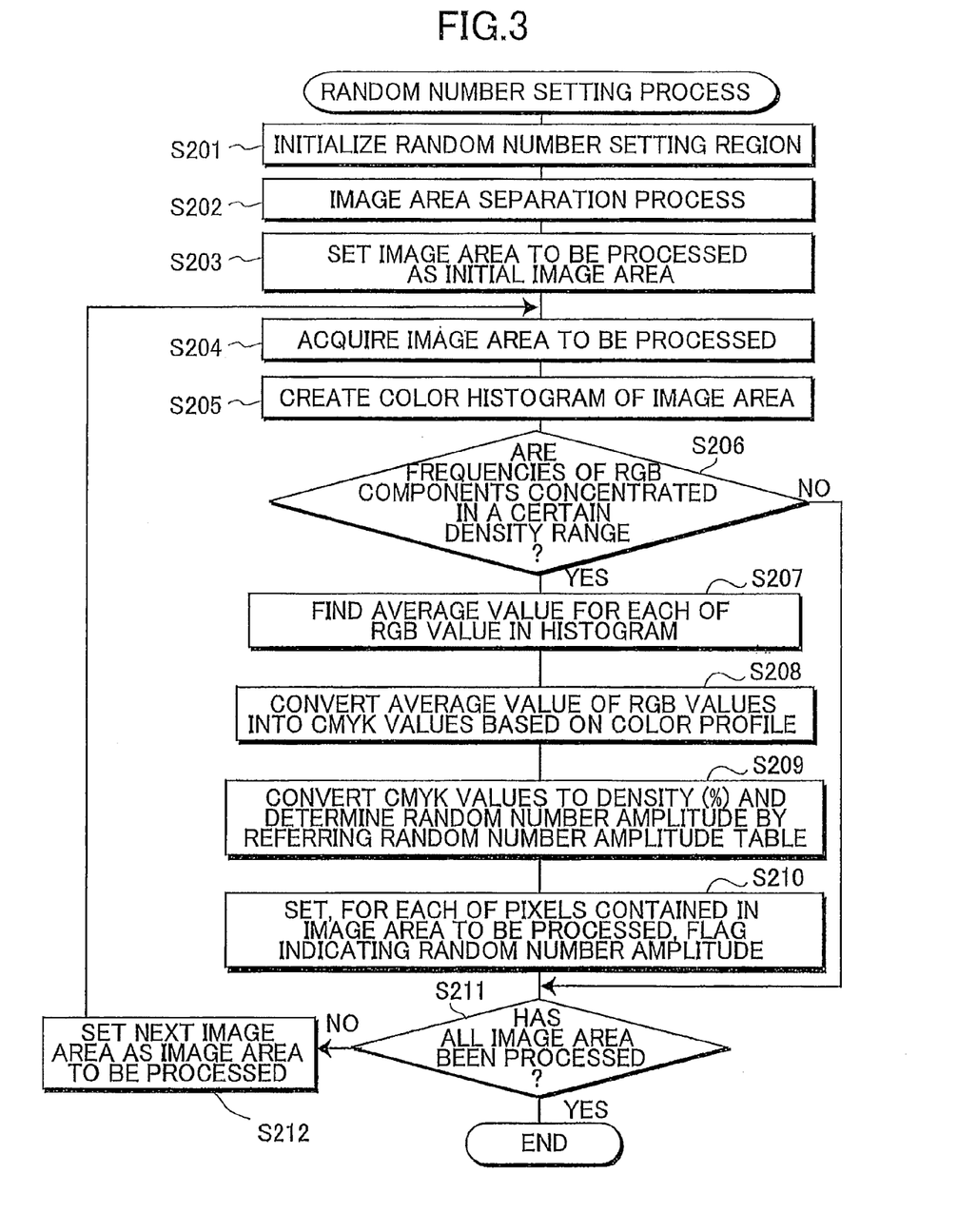
FIG. 3 is a flowchart illustrating steps in a random number setting process of the printing process shown in FIG. 2(b)

In S203 of FIG. 3, the controller 21 sets one image area as the initial image area to be processed based on a predetermined process order set for all image areas in the image being printed. The term "process order" is used in this embodiment for convenience and has no particular significance. The process order may be set based on the positions of the image areas within the image, for example.

In S204 the controller 21 acquires pixel values for all pixels in the image area being processed. In S205 the controller 21 creates a color histogram of the image area. The color histogram in this embodiment indicates the distribution of densities between 0 and 100% for the RGB color components in each pixel of the image area being processed. In the example shown in FIG. 5, the image has been separated into two image areas. The image area on the left showing the woman in the foreground has a combination of varied colors. Hence, in the color histogram corresponding to this image region shown in the bottom left of FIG. 5, the frequencies of RGB components are distributed over a wide density range. The image region on the right depicting the gray background, on the other hand, has only colors of the same type. Hence, in the color histogram corresponding to this image region shown in the bottom right of FIG. 5, the frequencies of RGB components are concentrated within a certain density range. In other words, the color histogram can be used to determine that the image is filled with like colors when the frequencies of densities peak at a certain density, and can determine that the image has a variety of colors when the densities are distributed over a wide range. Note that the color histograms shown in FIG. 5 are formed by adding the RGB values in color histograms such as those shown in FIG. 2(c). For example, the frequency for the density 50% in the color histogram of FIG. 5 is obtained by adding the frequencies of R values, G values, and B values having a density of 50%.

Returning to FIG. 3, in S206 the controller 21 determines whether the frequencies of RGB components in the color histogram created in S205 are concentrated in a certain density range, as in the color histogram shown in the bottom right of FIG. 5. In other words, the controller 21 determines whether or not processed image includes a filled region. All pixels contained in the filled region represent colors whose color differences fall within a predetermined color difference. In other words, the controller 21 determines whether the image area being processed is an area uniformly filled with the same or similar colors (colors within a certain color difference). More specifically, the controller 21 determines whether all color components fall within a predetermined density range about an average density (±5%, for example).

By using a narrower density range, the random number adding process will be performed only on image areas filled with substantially the same color. Conversely, by using a wider density range, the process will also be performed on image areas configured of colors of similar types, such as forest green or ocean blue, but having a certain degree of variation. As will be described later, random numbers are added in the random number adding process when all color components fall within this density range. Here, a density range of approximately ±5% is preferable, because expanding the density range too much will result in random numbers being added to regions in which banding is not noticeable, producing a perceptible grainy look to the image. Here, a strict determination may be used to find whether all components fall within the specified density range, but the determination may also be made more flexible by finding whether at least a prescribed percentage of the components (a percentage near 100%) fall within the density range.

If the controller 21 determines in S206 that the RGB components are concentrated within the certain density range, in S207 the controller 21 finds an average value for each of the RGB values in the color histogram.

In S208 the controller 21 converts the average values of the RGB values found in S207 to CMYK values according to the color profiles used in the color conversion process. For example, when the average values for RGB are 59, 58, and 61%, respectively, these values are converted to the RGB values 150, 148, and 156 based on the 0-255 scale. The controller 21 converts the 256-level RGB values to the CMYK values according to the color profiles.

Figure 4C:
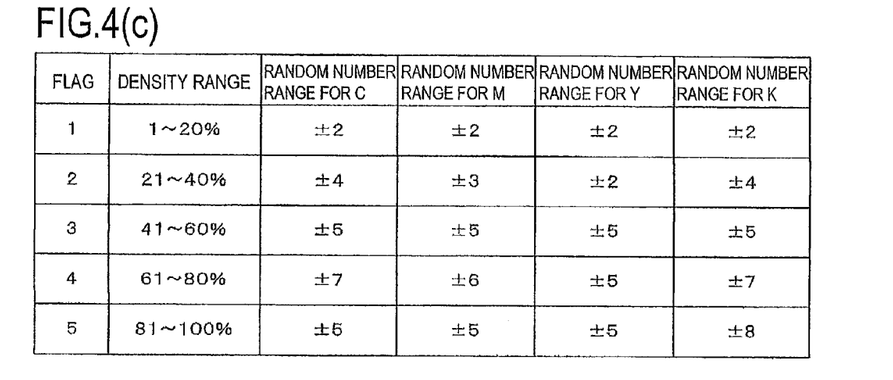
FIG. 4(c) is a table showing an example of a random number amplitude table stored in the image processing device.

In S209 the controller 21 converts the CMYK values acquired in S208 (in the scale 0-255) to densities (%) and references a random number amplitude table to determine the random number amplitude that will be used in the random number adding process. As shown in FIG. 4(c), the random number amplitude table defines a random number amplitude for each of the CMYK colors that corresponds to each of the density ranges 1-20%, 21-40%, 41-60%, 61-80%, and 81-100%. Each random number amplitude is represented by one of the flag numbers 1-5. For example when the density of the C value is 50%, the random number amplitude is set to ±5 (flag no. 3) since this density falls within the range 41-60%. Random number amplitudes are similarly set for the other color values. In other words, the controller 21 selects, for each color of each pixels, one of the plurality of random number amplitudes corresponding to a range into which the color value of the pixel falls.

In S210 of FIG. 3, the controller 21 sets the flag in the random number setting region for each color of each pixel in the image area being processed to the flag number indicating the random number amplitude determined in S209. Subsequently, the controller 21 advances to S211.

The controller 21 also advances to S211 upon determining in S206 that the RGB components are not concentrated within the certain density range. In this case, the controller 21 does not set flags before advancing to S211. In S211 the controller 21 determines whether the process described above has been completed for all image areas in the image to be printed.

When determining in S211 that there remain unprocessed image areas, in S212 the controller 21 sets the next image area as the image area to be processed and returns to S204. When the controller 21 determines in S211 that all image areas of the image to be printed have been processed, the controller 21 ends the process to configure a random number setting region. Thus, in the process to configure a random number setting region, the controller 21 identifies image areas in the image to be printed as filled regions (specified areas) when the densities of all pixels in the region fall within a prescribed density range, and sets random number amplitudes for pixels in the image in order that the random number adding process is performed on pixels in these filled regions.

Figure 6A:
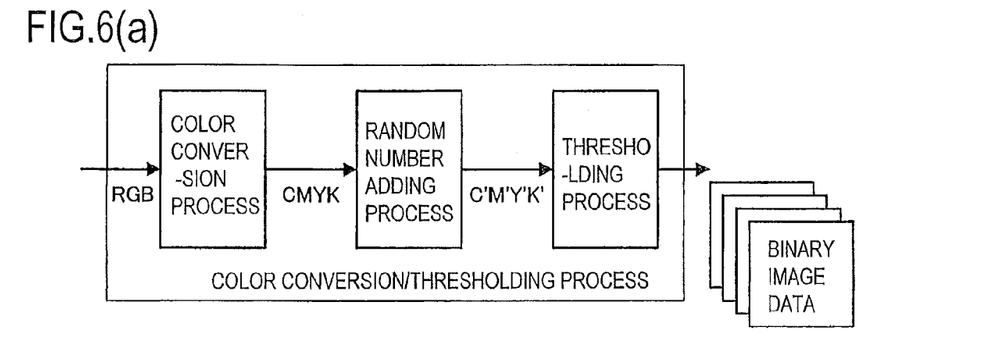
FIG. 6(a) is an explanatory diagram showing a color conversion/thresholding process executed by the image processing device.
Figure 6B:
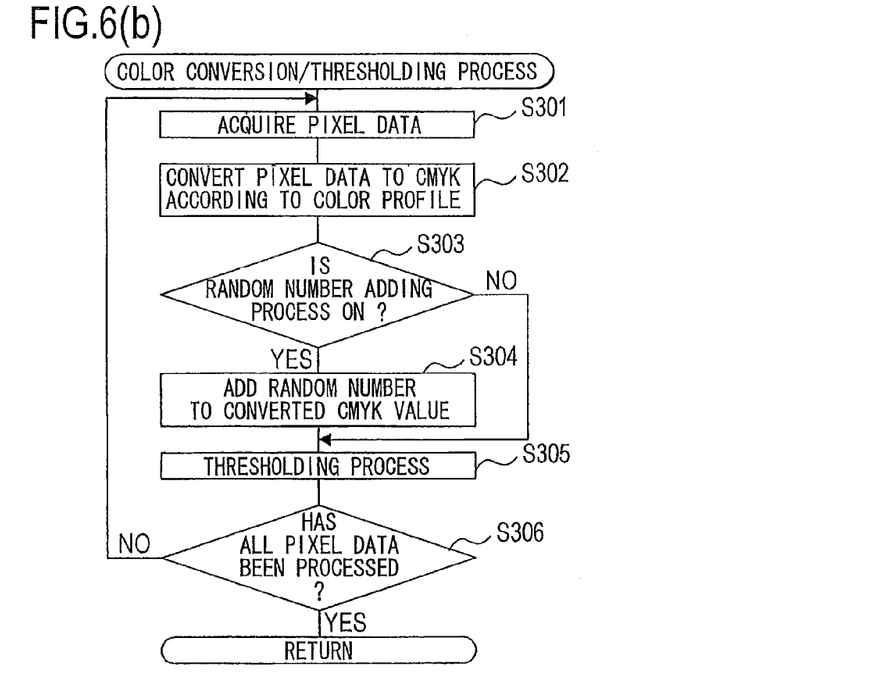
FIG. 6(b) is a flowchart illustrating steps in the color conversion/thresholding process of the printing process shown in FIG. 2(b)

Next, the color conversion/thresholding process executed in S103 of the printing process described above (FIG. 2(b)) will be described with reference to the flowchart in FIG. 6(b). In S301 at the beginning of the color conversion/thresholding process, the controller 21 acquires pixel values (256-level RGB values produced in the rasterization process) for one pixel in the image to be printed that has not yet been subjected to the thresholding process described later in S305. These pixel values are acquired as the process target. In other words, the controller 21 acquires image data including a plurality of sets of pixel data.

In S302 the controller 21 executes a color conversion process. In this process, the controller 21 uses color profiles to convert the pixel values expressed in 256-level RGB values into pixel values expressed in 256-level CMYK values. In S303 the controller 21 determines whether the option for performing the random number adding process is set to ON. As described earlier, the user can select whether or not to execute the random number adding process. Thus, the controller 21 determines whether the option for executing the random number adding process has been set to ON.

If the controller 21 determines in S303 that the option for performing the random number adding process is set to ON (S303: YES), in S304 the controller 21 executes the random number adding process to add a random number to each of the pixel values produced in the color conversion process (i.e., CMYK values). More specifically, the controller 21 reads a flag for the pixel being processed from the random number setting region for each of the CMYK colors and determines and sets a random number for each color within the range of the random number amplitude specified by the flag. Next, the controller 21 adds the random number set based on the random number amplitude for cyan (C) to the C value and similarly adds the random numbers set for magenta (M), yellow (Y), and black (K) to the M value, Y value, and K value, respectively. Subsequently, the controller 21 advances to S305.

However, if the controller 21 determines in S303 that the option for the random number adding process is set to OFF (S303: NO), the controller 21 advances directly to S305 without executing the random number adding process. In S305 the controller 21 executes a thresholding process for converting the image data to binary values using a dither matrix (a clustered-dot dither matrix in this embodiment).

In S306 the controller 21 determines whether the thresholding process has been executed for all pixels in the image to be printed. The controller 21 returns to S301 when determining that there are still some pixels that have not been subjected to the thresholding process (S306: NO) and ends the color conversion/thresholding process when determining that all pixels have been subjected to the thresholding process (S306: YES).

Next, the random number amplitude setting process will be described with reference to the flowchart in FIG. 7. The controller 21 of the printer 2 (and specifically, the CPU 211 of the controller 21) executes this process in order to set random number amplitudes for the random number amplitude table (see FIG. 4(c)). The controller 21 executes this random number amplitude setting process upon receiving an instruction from the user, upon detecting a new toner cartridge mounted in the printer 2 (when toner is replaced), or upon determining that a change in ambient values, including at least one of temperature and humidity detected by the temperature/humidity sensor 28, exceeds a predetermined threshold (i.e., when there is a major change in the printing environment).

Figure 8:
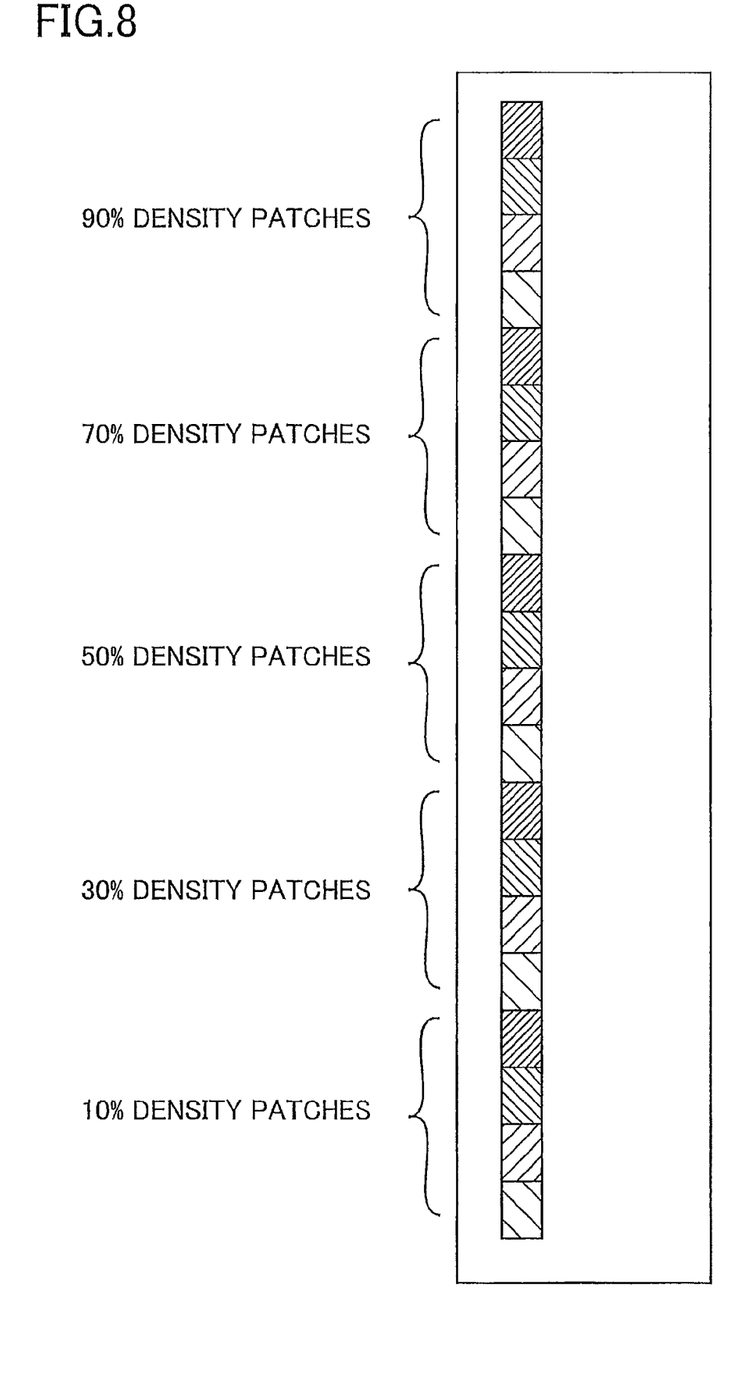
FIG. 8 is an explanatory diagram showing an example of a set of density patches formed on a recording medium.

In S401 at the beginning of the random number amplitude setting process, the controller 21 controls the image forming unit 26 to form density patches directly on the conveying belt, as illustrated in FIG. 2(a). The density patches are formed in toner used for printing and represent a plurality of density levels for each of the CMYK colors. In this embodiment, the controller 21 forms density patches at 10%, 30%, 50%, 70%, and 90%, as illustrated in FIG. 8. These percentages represent the mean value of the ranges 1-20%, 21-40%, 41-60%, 61-80%, and 81-100% and are used to determine the random number amplitudes for these five density ranges. In other words, the image forming unit 26 forms a plurality of density patches corresponding to respective ones of a plurality of predetermined ranges of imputable color values individually.

Figure 7:
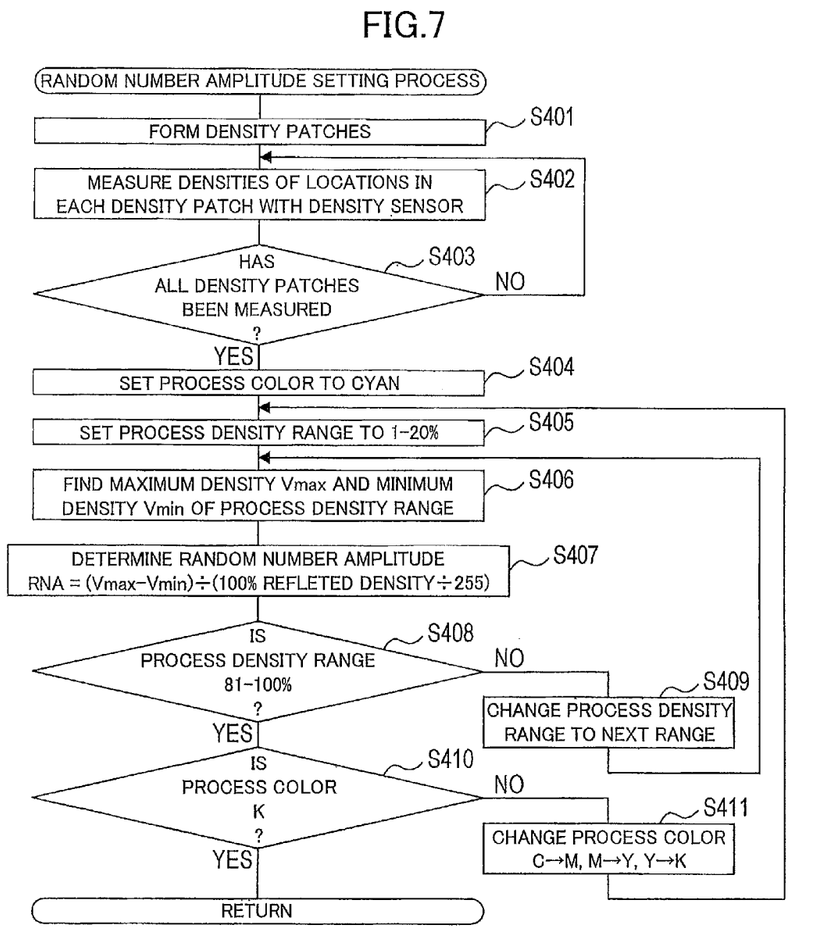
FIG. 7 is a flowchart illustrating steps in a random number amplitude setting process executed by the image processing device.
Figure 9A:
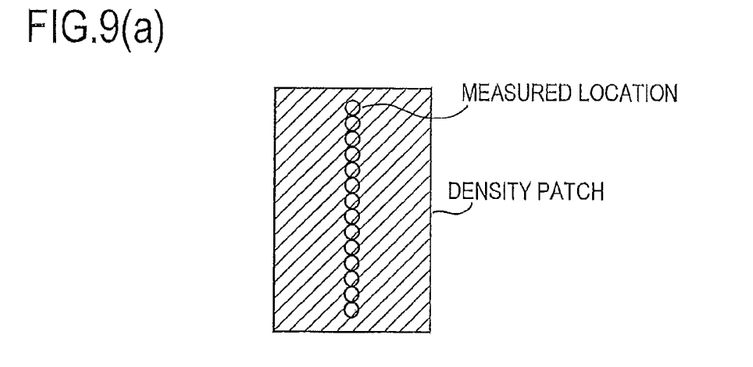
FIG. 9(a) is an explanatory diagram showing a plurality of measured locations of the density patch.

In S402 of FIG. 7, the controller 21 controls the density sensor 27 to measure the densities (reflected densities) of the density patches, as illustrated in FIG. 2(a). More specifically, the density sensor 27 is controlled to measure the density of each patch in a plurality of locations at a prescribed pitch (1 mm, for example) along the conveying direction, as shown in FIG. 9(a).

In S403 the controller 21 determines whether density measurements have been completed for all density patches formed on the conveying belt. While the measurements have not been completed for all density patches (S403: NO), the controller 21 continues to return to S402.

However, when density measurements have been completed for all density patches (S403: YES), in S404 the controller 21 sets the process color to cyan (C). In S405 the controller 21 sets the process density range to 1-20%.

Figure 9B:
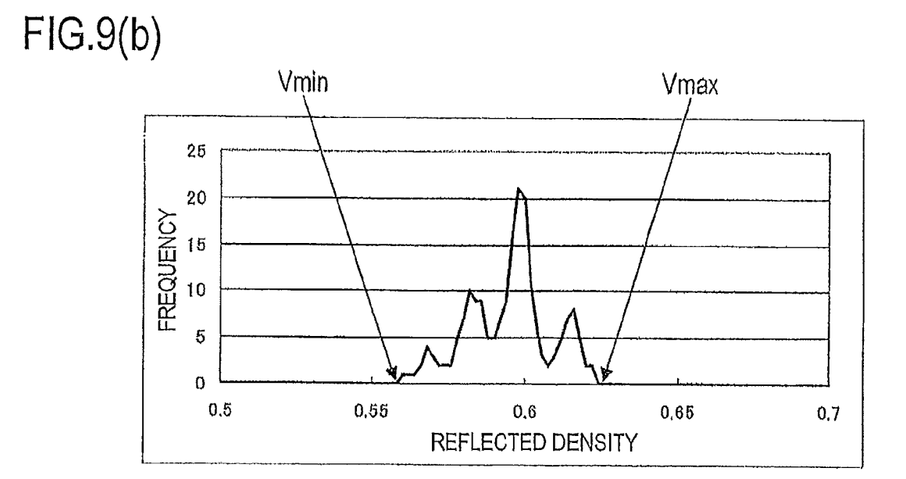
FIG. 9(b) is a graph showing a distribution of densities from the plurality of measured densities of measured locations.

In S406 the controller 21 finds a maximum density Vmax and a minimum density Vmin from among the measured densities at the plurality of locations in the density patch corresponding to the process density range and color (for example, the 10% density patch when the process density range is 1-20%). Specifically, the controller 21 can identify a distribution of densities from the plurality of measured densities for the process density patch and can identify a maximum value and a minimum value from this distribution, as shown in FIG. 9(b).

In S407 the controller 21 sets the random number amplitude by substituting the maximum and minimum densities Vmax and Vmin found in S406 into the following equation.

$$\text{Random number amplitude} = (V\text{max} - V\text{min}) \div (100\% \text{ reflected density} \div 255)$$

Here, 100% reflected density signifies the reflected density when the color of the process density patch (one of the CMYK colors) is formed at a density of 100%. The 100% reflected density can be set according to method (1) or (2) below, for example.

(1) 100% reflected density may be measured at the factory when the printer 2 is manufactured and stored on the printer 2 (or in the printer driver 153).

(2) The printer 2 may be configured to form actual 100% density patches in a calibration process initiated by the user, with the measured values being stored on the printer 2.

While either method may be used, method (2) is advantageous in handling fluctuations in 100% density caused by changes in the environment, toner replacement, and a decline in toner quality. Using the above methods, the controller 21 treats the difference between the maximum and minimum density values measured at the plurality of locations on a single density patch as the degree of banding potential and sets a random number amplitude proportional to this difference.

For example, if 100% reflected density of cyan (C) is 1.5, the maximum density Vmax for the 50% density patch in cyan (C) is 0.62, and the minimum density Vmin for the same patch is 0.56, then:

$$\text{Random number amplitude} = (0.62 - 0.56) \div (1.5 \div 255) = 10.2$$

Accordingly, in the subsequent random number adding process, the controller 21 will add a random number generated within the range from −5 to +5 to the C value for cyan within the density range 41-60%.

In S408 the controller 21 determines whether the process density range is 81-100%. If the process density range is not found to be 81-100% (S408: NO), in S409 the controller 21 changes the process density range to the next higher range. In other words, if the process density range is currently 1-20%, the controller 21 changes the process density range to 21-40%. Similarly, the controller 21 changes the process density range to 41-60% if the current range is 21-40%, to 61-80% if the current range is 41-60%, and to 81-100% if the current range is 61-80%. Subsequently, the controller 21 returns to S406.

However, if the controller 21 determines that the process density range is 81-100% (i.e., that the process has been completed for all five density ranges; S408: YES), in S410 the controller 21 determines whether the process color is currently black (K).

If the controller 21 determines that the process color is not black (S410: NO), in S411 the controller 21 changes the process color to the next color. Specifically, the controller 21 changes the process color to magenta (M) if the process color is currently cyan (C), to yellow (Y) if the process color is currently magenta (M), and to black (K) if the process color is currently yellow (Y). Subsequently, the controller 21 returns to S405.

On the other hand, if the controller 21 determines in S410 that the process color is currently black (K) (i.e., that the above process has been completed for all four CMYK colors; S410: YES), then the controller 21 ends the random number amplitude setting process. Accordingly, the controller 21 determines a plurality of random number amplitudes corresponding to respective ones of the plurality of predetermined ranges for each color.

3. Effects of the Invention

According to the embodiment described above, the printer 2 modifies the densities in image areas having the same or similar colors by performing a process to add random numbers to the image being printed. Since this has the effect of offsetting changes in density caused by banding, banding in the printed image can be made less noticeable. Moreover, since the random number adding process is performed on the image prior to performing a thresholding process with a dither matrix, the method of the preferred embodiment can suppress omissions of isolated dots and filling in of isolated blank parts.

Figure 10A:
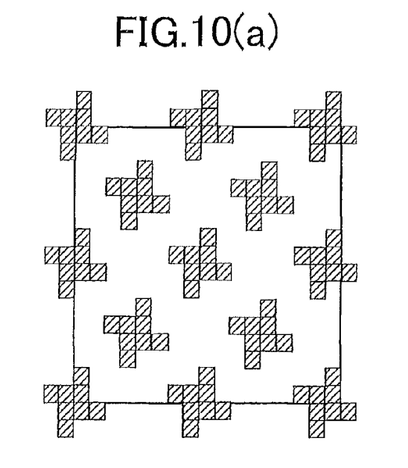
FIG. 10(a) is an explanatory diagram showing an example of binary image that is binarized based on a dither matrix.
Figure 10B:
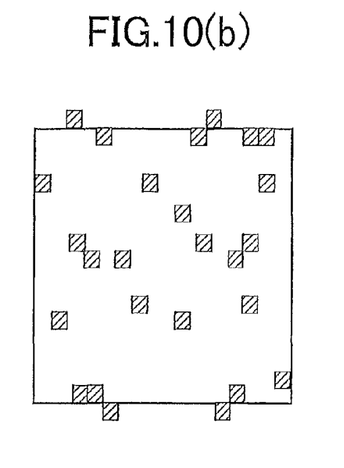
FIG. 10(b) is an explanatory diagram showing an example of random image.
Figure 10C:
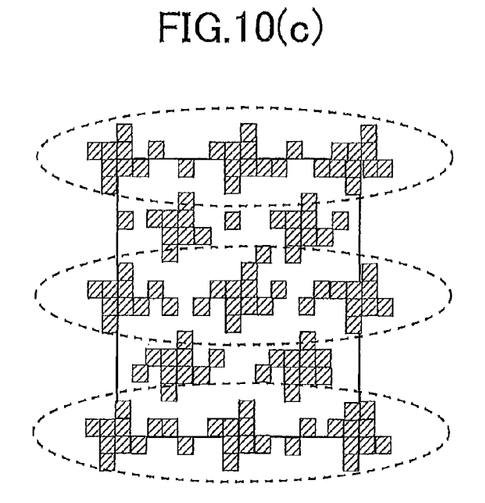
FIG. 10(c) is an explanatory diagram showing an image by adding the random image shown in FIG. 10(b) to the binary image shown in FIG. 10(a)
Figure 10D:
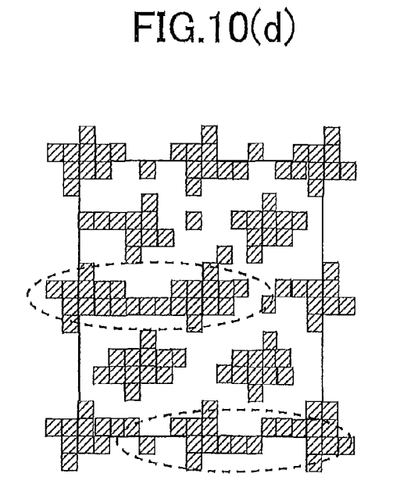
FIG. 10(d) is an explanatory diagram showing another example of image that is formed by adding another random image to the binary image.

That is, if the random numbers (noise) were added after the thresholding process, as with the technology described in the related art section, a composite image would be formed by combining a random image, such as that shown in FIG. 10(b), to a regular image based on a dither matrix, such as that shown in FIG. 10(a). Consequently, the regularity produced by the dither matrix would be lost in the composite image, as illustrated in FIG. 10(c), increasing the likelihood of isolated dots and blank parts, as shown in the areas of FIG. 10(c) encircled by dotted lines. Hence, the isolated dots may occasionally be omitted and the isolated blank parts occasionally filled due to scattered toner and other phenomena occurring during the printing operation. When isolated blank parts are filled, as depicted in FIG. 10(d), line-like shapes are generated locally in various areas, such as those encircled by dotted lines in FIG. 10(d), reducing the quality of the printed image.

In contrast, by performing the random number adding process prior to the thresholding process with a dither matrix, as described in the preferred embodiment, the arrangement of dots in the printed image are made regular by the dither matrix, thereby suppressing the omission of isolated dots and the filling in of isolated blank parts. Therefore, this method can suppress a drop in quality in images printed by the printer 2.

Moreover, since the random number adding process is executed on filled regions, in which noticeable banding is common, the method of the preferred embodiment can suppress a drop in image quality (increased graininess and the like) occurring when the random number adding process is performed on other regions in which banding is unlikely to be noticeable (image areas having a mixture of varied colors, for example). A particular feature of the invention is the ability to identify filled regions according to a relatively simple process, since filled regions are determined to be image areas separated according to the image area separation process whose pixels all have a density within a prescribed density range.

The printer 2 determines random number amplitudes based on measured densities of density patches. Accordingly, the printer 2 can set suitable amplitudes for random numbers, even when the banding potential varies due to changes in printing conditions, such as changes in the environment or manufacturing related variations in the printer 2 itself. More particularly, the printer 2 increases the amplitude of random numbers in proportion to the difference between maximum and minimum measured values for the same density patch, and performs the random number adding process using an amplitude of random numbers that corresponds to the density of the pixel being processed. Accordingly, the printer 2 can add a random number suitable to the degree of banding potential.

Since random numbers are added to pixel values after the pixel values have undergone the color conversion process, the printer 2 can add random numbers that are more suitable to the degree of banding potential than when adding random numbers to pixel values prior to performing the color conversion process. In other words, the printer 2 according to the preferred embodiment adds random numbers suited to the densities of the CMYK colors produced from the color conversion process, because it is not possible to add random numbers that are suited to the degree of banding potential for CMYK colors when adding these numbers to the RGB values prior to performing the color conversion process.

4. Variations of the Embodiment

While the invention has been described in detail with reference to specific embodiments thereof, it would be apparent to those skilled in the art that many modifications and variations may be made therein without departing from the spirit of the invention, the scope of which is defined by the attached claims.

(A) In the above-described embodiment, image areas with the same or similar colors are identified as filled regions, but the condition for identifying image areas as filled regions may be that all pixels in the image area have the same color.

(B) While the density ranges in the random number amplitude table described in the preferred embodiment (see FIG. 4(c)) are increments of 20%, these ranges may be narrower or broader. Further, the density ranges need not be uniform.

For example, the density range may be made narrower for densities in which banding is relatively noticeable and wider for other densities, as in 1-40%, 41-50%, 51-60%, and 61-100%.

Further, the number of variations in the density patches (the number of density levels) need not be the same as the number of density ranges in the random number amplitude table. The number of density variations in the density patches may be greater than the number of density ranges in the table, for example, by setting density patches at 20% intervals and density ranges at 10% intervals, for example. In this case, each random number amplitude may be found from measurement results for a plurality of density patches. Conversely, the number of density variations in the density patches may be made smaller than the number of density ranges, and random number amplitudes not covered by the measurements may be found through linear interpolation or the like.

(C) In the preferred embodiment, the density patches are formed on the conveying belt used to convey the printing media. However, if the printer is configured to transfer toner images from the photosensitive members onto an intermediate transfer belt temporarily and subsequently to transfer the images onto the printing medium, the density patches may be formed on the intermediate transfer belt. Alternatively, the density patches may be formed on a printing medium.

(D) While the processes according to the present invention are performed on the printer 2 in the preferred embodiment, these processes may be performed on the personal computer 1 as part of the processes implemented by the printer driver 153.

What is claimed is:

1. An image processing device comprising:
a storage unit that stores a dither matrix;
a processing unit; and
a memory storing instructions that, when executed by the processing unit, cause the processing unit to implement:
acquiring a first image including a plurality of pixels, each pixel having a color value;
determining whether or not the first image includes a specified area, the specified area containing at least part of the plurality of pixels, all pixels contained in the specified area representing colors whose color differences fall within a predetermined color difference;
updating, when it is determined that the first image includes a specified area, the first image to generate a second image by adding a random number to a color value of each of pixels that are contained in the specified area, a color value of each of remaining pixels that are not contained in the specified area being unchanged;
converting the color value of each of pixels that are contained in the second image into a binary value by using the dither matrix;
detecting edges from the first image;
dividing the first image into a plurality of image areas based on the detected edges; and
finding a distribution of densities of pixels that are included in each of the plurality of image areas;
wherein the determining determines, as the specified area, an image area whose distribution falls within a prescribed density range.

2. The image processing device according to claim 1, wherein, for each of the pixels that are contained in the specified area, the converting converts a corresponding updated color value into a binary value by using the dither matrix, and
wherein, for each of the remaining pixels that are contained in the specified area, the converting converts a corresponding color value into a binary value by using the dither matrix.

3. The image processing device according to claim 1, wherein the instructions further cause the processing unit to implement:
forming a density patch; and
measuring a density of the density patch;
determining a random number amplitude based on the measured density.

4. The image processing device according to claim 3, wherein the measuring measures a plurality of densities of a plurality of locations in the density patch; and
wherein the determining the random number amplitude is based on a difference between a maximum density and a minimum density among the plurality of densities.

5. The image processing device according to claim 4, wherein the random number amplitude is proportional to the difference between the maximum density and the minimum density.

6. The image processing device according to claim 3, wherein the forming forms a plurality of density patches corresponding to respective ones of a plurality of predetermined ranges of color values individually;
wherein the determining the random number amplitude determines a plurality of random number amplitudes for the plurality of density patches, each random number amplitude corresponding to one of the plurality of predetermined ranges;
wherein the instructions further cause the processing unit to implement selecting, for each pixel of the pixels that are contained in the specified area, one of the plurality of random number amplitudes corresponding to a range into which the color value of the pixel falls;
wherein the determining the random number determines, for each of the pixels that are contained in the specified area, a random number based on the determined random number amplitude; and wherein the updating updates the first image to the second image by adding the determined random number to a color value of each of the pixels that are contained in the specified area.

7. The image processing device according to claim 1, wherein the acquiring includes:
acquiring image data including a plurality of sets of pixel data; and
converting each set of pixel data into a color value of one of the plurality of pixels.

8. The image processing device according to claim 1, wherein a histogram indicates the distribution of RGB color values in each of the plurality of image areas;
wherein the instructions cause the processing unit to further implement:
converting the RGB color values into CMYK color values for each pixel in each of the plurality of image areas; and
determining a random number amplitude for each of the plurality of image areas based on the CMYK color values.

9. An image processing method comprising:
acquiring, by an image processing device, a first image including a plurality of pixels, each pixel having a color value;
determining whether or not the first image includes a specified area, the specified area containing at least part of the plurality of pixels, all pixels contained in the specified area representing colors whose color differences fall within a predetermined color difference;
updating, when it is determined that the first image includes a specified area, the first image to generate a second image by adding a random number to a color value of each of pixels that are contained in the specified area, a color value of each of remaining pixels that are not contained in the specified area being unchanged;
converting the color value of each of pixels that are contained in the second image into a binary value by using a dither matrix;
detecting edges from the first image;
dividing the first image into a plurality of image areas based on the detected edges; and
finding a distribution of densities of pixels that are included in each of the plurality of image areas;
wherein the determining determines, as the specified area, an image area whose distribution falls within a prescribed density range.

10. A non-transitory computer readable storage medium storing a set of program instructions installed on and executed by an image processing device, the program instructions comprising:
acquiring a first image including a plurality of pixels, each pixel having a color value;
determining whether or not the first image includes a specified area, the specified area containing at least part of the plurality of pixels, all pixels contained in the specified area representing colors whose color differences fall within a predetermined color difference;
updating, when it is determined that the first image includes a specified area, the first image to generate a second image by adding a random number to a color value of each of pixels that are contained in the specified area, a color value of each of remaining pixels that are not contained in the specified area being unchanged;
converting the color value of each of pixels that are contained in the second image into a binary value by using a dither matrix stored in the image processing device;
detecting edges from the first image;
dividing the first image into a plurality of image areas based on the detected edges; and
finding a distribution of densities of pixels that are included in each of the plurality of image areas;
wherein the determining determines, as the specified area, an image area whose distribution falls within a prescribed density range.

* * * * *